L. C. DOANE ET AL
May 31, 1932. LIGHTING FIXTURE WALL BRACKET Re. 18,482
2 Sheets-Sheet 1
Original Filed April 23, 1927
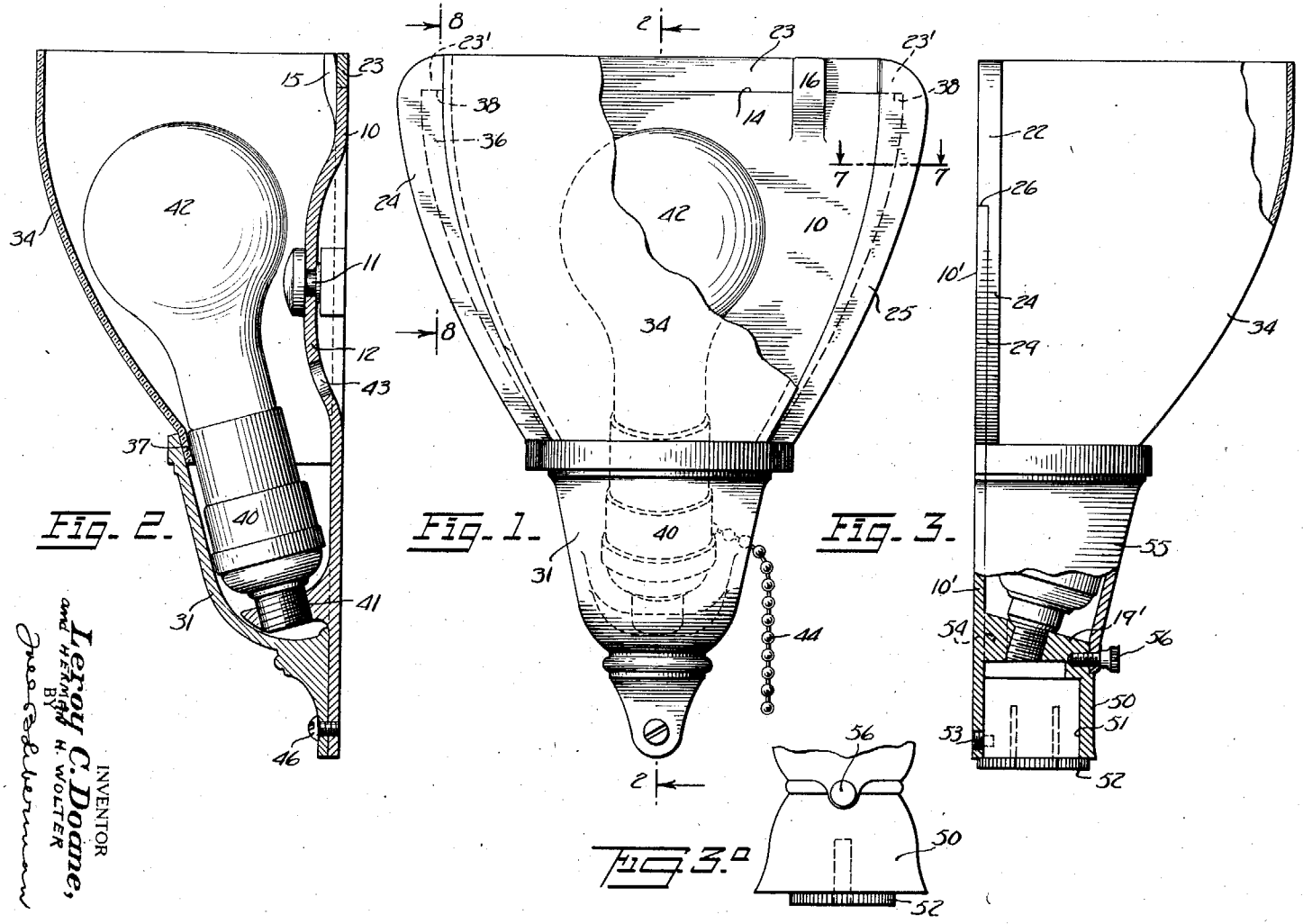
INVENTOR
Leroy C. Doane,
and HERMAN H. WOLTER
BY
Jno. B. Liberman
ATTORNEY May 31, 1932.
L. C. DOANE ET AL
LIGHTING FIXTURE WALL BRACKET
Re. 18,482
Original Filed April 23, 1927
2 Sheets-Sheet 2
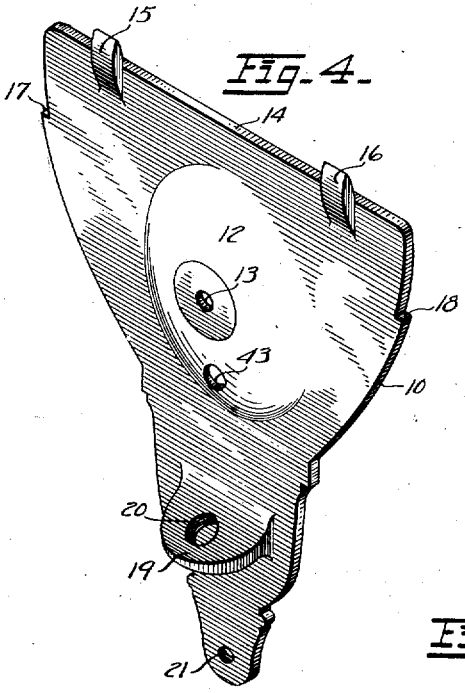
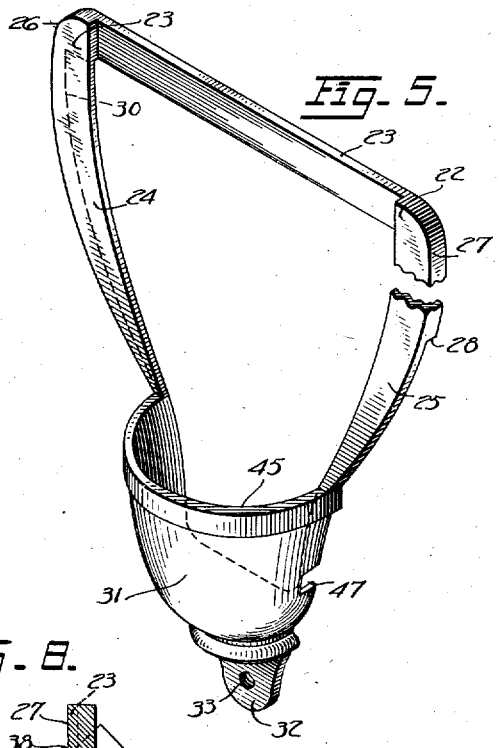
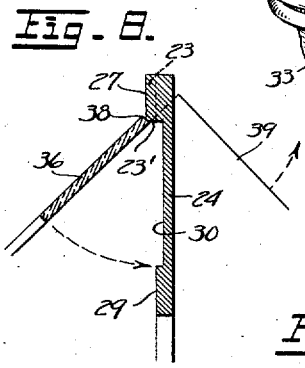
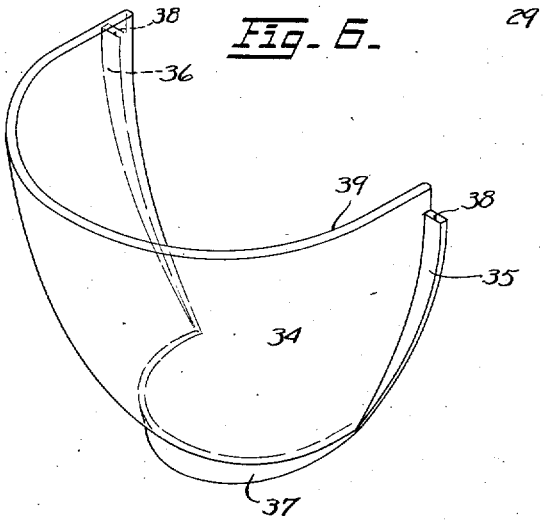
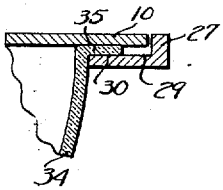
INVENTOR
Leroy C. Doane,
and HERMAN H. WOLTER.
BY
Jno. S. Silverman
ATTORNEY Reissued May 31, 1932 Re. 18,482

UNITED STATES PATENT OFFICE

LEROY C. DOANE AND HERMAN H. WOLTER, OF MERIDEN, CONNECTICUT, ASSIGNORS TO THE MILLER COMPANY, OF MERIDEN, CONNECTICUT, A CORPORATION OF CONNECTICUT

LIGHTING FIXTURE WALL BRACKET

Original No. 1,818,119, dated August 11, 1931, Serial No. 186,001, filed April 23, 1927. Application for reissue filed December 31, 1931. Serial No. 584,236.

The present invention relates to lighting fixture wall brackets and is more particularly directed toward lighting fixtures of the type known as wall brackets.

The present invention contemplates a form of wall pocket which has a backplate which may be permanently mounted on an outlet box or other electrical fitting. It also contemplates the provision of a removable cover plate which supports a removable translucent pocket or cover for an electric lamp adapted to be carried in a socket housed in a pocket formed in the lower part of the front plate.

An object of the invention is to provide a wall bracket of the type above referred to, wherein the transparent member, preferably a translucent glass pocket, may be easily inserted into a front plate when this front plate is detached from the supporting back plate, and which is securely locked in place when the front plate is in position on the back plate.

A further object of the invention is to provide two cooperative plates of pleasing outline and contour and capable of carrying desired ornamentation to produce a lighting fixture of pleasing outline and ornament.

Another object of the present invention is to provide a wall pocket type lighting fixture which may be conveniently made up to use a single lamp and of such a size that it may be used in ordinary house lighting. The fixture may be provided with a convenience outlet if desired.

A further object of the invention is to provide a fixture of the above type in which one can remove the glass pocket without disconnecting any of the electric wiring.

A further object of the invention is to provide a wall fixture having a socket supporting plate which may be mounted flat against the wall to cover a conventional outlet box and support the socket and lamp bulb in front of the plane of the wall and wherein the lamp bulb is concealed by an upwardly opening translucent glass shade whose side edges extend substantially to the wall so as to prevent the escape of laterally directed light. The shade is open at the top so that wall and ceiling surfaces may receive upwardly directed divergent light and diffuse the same.

The accompanying drawings show, for purposes of illustrating the invention, two of the many possible embodiments in which the invention may take form, it being understood that the drawings are illustrative of the invention rather than limiting the same.

In these drawings:

Figure 1 is a front elevational view of a lighting fixture wall bracket without a convenience outlet, parts being broken away;

Figure 2 is a vertical sectional view taken on the line 2—2 of Figure 1;

Figure 3 is a side elevational view of a form of wall bracket having a convenience outlet, a fragment of glass pocket being shown in section;

Figure 3*a* is a fragmentary view of the lower portion of the bracket of Figure 3;

Figure 4 is a perspective view of the back plate;

Figure 5 is a perspective view of the front plate;

Figure 6 is a perspective view of the glass cover;

Figure 7 is a fragmentary sectional view taken on the line 7—7 of Figure 1; and

Figure 8 is a sectional view taken on the line 8—8 of Figure 1, to show the method of inserting the glass pocket into the front plate, the back plate being omitted in this figure.

As shown in the drawings, a back plate 10 of suitable outline and configuration is mounted on an outlet box or the like by suitable means such as a fixture stud indicated at 11. As shown more in detail in Figure 4, this back plate is comparatively wide at the top and narrows toward the bottom. To facilitate mounting it on the outlet box or other electrical fitting, the center of the back plate is raised as indicated at 12, and a hole 13 is provided for passing the fixture stud 11 through the back plate. As here shown, the upper edge 14 of the back plate is straight and arranged horizontal. Members 15 and 16 extend upwardly from the front face of the wall plate and are spaced a short distance in front of the rear surface of the wall plate. As here indicated, the sides of the back plate, above narrow shoulders 17 and 18, are cut back a short distance. A forwardly extending lug 19 having a threaded aperture as indicated at 20 is carried adjacent the lower end of the back plate and a threaded hole 21 is placed as indicated in the lower end of the back plate.

The front plate 22, as here shown, has the same general shape as the back plate. It is provided with an upper cross bar 23 which is adapted to be placed behind the upwardly extending members 15 and 16 and to rest on the upper surface 14 of the back plate. It is also provided with downwardly converging side members 24 and 25 which are adapted to overlie the marginal portions of the back plate 10. As shown at 26 and 27, the upper outer portions of these side members are shaped so as to overlie the portion of the back plate above the narrow shoulders 17 and 18 and to fit the back plate between these shoulders and the upper surface 14 so as to define the position of the front plate on the back plate and prevents its sliding about on plate. For convenience, these portions 26 and 27 may extend to the rear surface of the back plate. As here indicated, these deeper portions extend down to a shoulder 28 which may fit the shoulders 17 and 18. As indicated more clearly in Figures 7 and 8 the lower portions of the side members 24 and 25 have a rear face 29 adapted to rest on the front face of the back plate 10. The inner back face of these side members is spaced some distance in front of the surface 29, as indicated at 30 so as to provide space for the flanges in the glass pocket to be described. Below the two side members 24 and 25, the plate is provided with a forwardly extending upwardly opening pocket 31 closed at the bottom as indicated in Figure 3. The lower end 32 of the front plate is provided with a screw hole 33.

The glass pocket or lamp cover 34 is shown more in detail in Figure 6. It is a general semi-circular configuration as viewed from the top and is provided with side flanges 35 and 36, and a bottom flange 37. As here shown the upper ends 38 of the flanges 35 and 36 do not extend all the way to the upper end 39 of the glass pocket.

A pull chain lamp socket 40 is mounted on a threaded stud or nipple 41 carried in the threaded hole 20 on the lug 19 of the back plate. This lamp socket is preferably carried at such an angle that the lamp 42 will be carried in front of the back plate 10. This lamp socket preferably has a side inlet for the wiring which may be brought from the outlet box through an aperture 43 in the back plate 10. The socket switch is controlled by a pull chain 44.

It will be noted that the wall pocket above described is one wherein the glass shade intercepts all the light emitted in front of the wall except the upwardly directed light which passes out above the shade for illuminating the ceiling and upper part of the wall. No laterally directed light escapes behind the shade and hence no bright spots or sharp shadows are formed on the wall or adjacent objects. All the light which reaches the eye at ordinary angles of observation is softened and diffused by the glass.

In assembling the fixture, the socket may be wired in and the back plate mounted on the outlet box in any convenient manner. The glass pocket may be inserted into the front plate aperture formed by the cross bar 43 and the side members 24 and 25 in the following manner: The glass cover member is passed through the aperture in the front plate from the rear (as indicated in Figure 8) so as to bring the upper ends 38 of the flanges 35 and 36 against the lower surfaces 23 in the upper rear corners of the front plate. The glass cover is then swung inwardly as indicated by the dotted circles to bring the flanges 35 and 36 against the rear faces 30 on the side members 24 and 25 of the front plate. In bringing the glass pocket to this position, the lower flange 37 is brought against the inner surface 45 of the lamp socket pocket 31. After the glass member has been so inserted in the front plate, the cross bar 23 in the front plate is passed over behind the prongs 15 and 16 and the front plate allowed to hang in place. A screw 46 is passed through the hole 33 and threaded into the hole 21 and secures the parts in place. A slot 47 is provided in the side of the lamp socket to permit the chain 44 to pass out from the interior of the fixture.

The convenience outlet style of fixture (shown in Figures 3 and 3*a*) may be made in substantially the same manner as that above described in detail. The back plate casting 10′ extends downwardly from the front and sides of the lamp socket supporting lug 19′, as indicated at 50. This provides a cylindrical recess 51 for a convenience outlet 52 which is accessible from underneath. The convenience outlet is held in place by a pilot screw 53 and the wires pass upwardly through a wire way 54. The front or husk casting 55, instead of being closed at the bottom, is open and comes down onto the back plate as indicated. A screw 56 may be used to fix the front plate in place.

It will be apparent from the foregoing that there is provided a lighting fixture wall bracket of the wall pocket type, in which the ornamental features of the fixture may be applied to the fixture or removed from the fixture without interfering with the electrical wiring, that one can readily accomplish lamp renewals whenever desired and that the transparent part, preferably glass, may be readily removed for cleaning when desired. The wall bracket, whether supplied with the convenience outlet or not, is one which may be conveniently made of a size suitable for domestic or home lighting and will provide a pleasing indirect lighting unit. While matters of surface ornament have been omitted from the present drawings, it will be obvious that the transparent cover member such as glass may be ornamented in any suitable manner and also that ornamentation may be placed on the exposed parts of the plates. Also that the rear plate may, if desired, be provided with ornamental parts which extend laterally beyond the front plate so as to be visible.

What is claimed is:

1. In a lighting fixture wall bracket, a front plate having a cross bar at the upper end, downwardly extending converging side members carried at the ends of the cross bar, and a forwardly extending upwardly and rearwardly opening, lamp socket pocket carried at the lower ends of the side members, a back wall plate having upwardly extending members to removably receive the cross bar on the front plate, the cross bar resting on the upper edge of the back plate, and a lamp socket housed in the pocket and supported from one of the plates.

2. In a lighting fixture wall bracket, a front plate having a cross bar at the upper end, downwardly extending converging side members carried at the ends of the cross bar, and a forwardly extending upwardly and rearwardly opening lamp socket pocket carried at the lower ends of the side members, a back wall plate having upwardly extending members to removably receive the cross bar on the front plate, the cross bar resting on the upper edge of the back plate, a forwardly extending lug on the back plate and a lamp-socket supported thereon and housed in the pocket.

3. A wall type lighting fixture comprising a rear mounting plate for supporting the fixture from an outlet box or the like, a removable plate in front of the rear plate, the lower portion of the front plate extending forwardly to provide a pocket for a lamp socket, an upwardly opening lamp socket in said pocket, a lamp in the socket, the upper portion of the front plate having a large aperture, and a translucent pocket forming shade supported in the front plate and concealing the lamp.

4. A wall type lighting fixture comprising a rear mounting plate for supporting the fixture from an outlet box or the like, a removable plate in front of the rear plate, the lower portion of the front plate extending forwardly to provide a pocket for a lamp socket, an upwardly opening lamp socket in said pocket, a lamp in the socket, the upper portion of the front plate having a large aperture, and a translucent pocket forming shade for concealing the lamp, the shade being insertible into the aperture in the front plate when removed from the back plate and having flanges which immovably secure it when the front plate is attached.

5. In a wall type lighting fixture, a substantially flat wall plate, an upwardly opening convex translucent shade in front of the wall plate and having side flanges resting against the front of the wall plate, the shade being narrower and shallower at the bottom and having a convex, substantially horizontal peripheral flange at the lower end to thereby space the center of the lower end of the shade away from the wall plate, and a front plate supported from the back plate and overlying the flanges on the shade.

6. In a wall type lighting fixture, a substantially flat wall plate, an upwardly opening convex translucent shade in front of the wall plate having side flanges resting against the front of the wall plate, the shade being narrower and shallower at the bottom and having a peripheral flange at the lower end, a front plate supported from the back plate and overlying the flanges on the shade, the front plate having a pocket for a lamp socket, a lamp socket in the pocket, and a lamp in the socket, the lamp being behind the shade.

7. A lighting fixture comprising a back plate, means for supporting the back plate on an outlet box or the like, a front plate removably carried by the back plate, there being an opening in the upper part of the front plate, an upwardly opening lamp socket supported between the plates and concealed by the front plate, a lamp in the socket, and a diffusing cover extending through the opening in the front plate and supported thereby, the cover extending forwardly and upwardly to conceal the lamp and upper part of the backplate.

8. A wall type lighting fixture comprising a plate having a flat rear face, means for supporting the plate, a translucent shade, the lower portion of the plate extending forwardly to provide a pocket disposed in front of the flat rear face of the plate, an upwardly opening lamp socket carried in said pocket, and a lamp in the socket, the shade being supported at its side edges by the plate and extending forwardly of the lamp to conceal the lamp, the shade being open at the top to permit access to the lamp.

9. A wall type lighting fixture comprising a plate having a flat rear face, means for supporting the plate, a translucent shade, the lower portion of the plate extending forwardly to provide a pocket disposed in front of the flat rear face of the plate, an upwardly opening lamp socket carried in said pocket, and a lamp in the socket, the shade being supported at its side edges by the plate and extending forwardly of the lamp to conceal the lamp, the shade being open at the top to permit access to the lamp, and having a downwardly extending flange about the lower edge carried inside the upper edge of the pocket.

10. A lighting fixture of the wall pocket type comprising a support adapted to be mounted flat against a side wall, a lamp socket carried by the support, a lamp bulb in the socket, the bulb and socket being spaced forwardly of the wall surface, and a rigid, pocket-forming, diffusing and transmitting screen about the lamp bulb, the screen being formed of a single piece of translucent material and having side edges close to the wall surface to prevent the escape of direct light in lateral directions and being open at the top to allow direct light to reach the wall and ceiling above the fixture, the lamp socket being mounted close to the wall with its axis inclined away from the wall to accommodate the large portion of the lamp bulb, the screen tapering downwardly to be underneath the large portion of the bulb.

11. A lighting fixture of the wall pocket type comprising a support adapted to be mounted flat against a side wall, a lamp socket carried by the support, a lamp bulb in the socket, the bulb and socket being spaced forwardly of the wall surface and a rigid pocket-forming, diffusing and transmitting screen about the lamp bulb, the screen being formed of a single piece of translucent material and having side edges close to the wall surface to prevent the escape of direct light in lateral directions and being open at the top to allow direct light to reach the wall and ceiling above the fixture, the support carrying an opaque cover member about the lamp socket and the screen extending down to said cover member.

12. A lighting fixture wall pocket having an upwardly opening rigid, translucent, pocket-forming screen having substantially uniform light transmission and diffusion throughout its entire area, the screen having side edges in a vertical plane and a mid-portion bulged forwardly to accommodate a lamp bulb, the screen being open at the top, a member adapted to be mounted flat against a side wall, means to support the screen from the member with its side edges close to the wall, an upwardly opening lamp socket carried on the front side of the lower part of the member, and a lamp bulb in the socket, the screen diffusing light in lateral, forward, and downward directions and allowing the escape of direct light upwardly.

13. A lighting fixture wall pocket comprising a supporting plate adapted to be mounted flat against a side wall, an upwardly opening lamp socket carried in front of the plate and adapted to carry a lamp bulb close to the wall, an upwardly opening rigid, translucent, pocket-forming screen having substantially uniform light transmission and diffusion throughout its entire area, the screen extending upwardly from below the lamp bulb about the front of the lamp bulb and rearwardly about the sides of the lamp bulb to substantially the plane of the supporting plate so as to intercept all the light except that passing out through the open top, and means for supporting the shade in place.

Signed at Meriden, in the county of New Haven and State of Connecticut, this 15th day of December, 1931.

LEROY C. DOANE.
HERMAN H. WOLTER.